United States Patent Office 3,367,991
Patented Feb. 6, 1968

3,367,991
THERMOSETTING MIXTURE OF EPOXIDE RESIN-AMINE ADDITION PRODUCTS AND AMINE-ALDEHYDE RESINS
Darrell D. Hicks, Louisville, Ky., assignor to Celanese Coatings Company, a corporation of Delaware
No Drawing. Filed Jan. 27, 1965, Ser. No. 428,540
16 Claims. (Cl. 260—834)

ABSTRACT OF THE DISCLOSURE

Thermoplastic addition product of amines and polyepoxide resins are cured by reaction with amine-aldehyde resins. In an example 21.3 parts of a butylamine-epoxide resin adduct was blended with 2.5 parts of a 60% solution of methylated methylol melamine solution and 0.8 part of a 25% solution of the morpholine salt of p-toluene sulfonate.

---

This invention relates to thermosetting compositions and more particularly to a thermosetting mixture of an epoxide resin-amine addition product and an amine-aldehyde resin.

Epoxide resins are well known industrial compounds that have found many uses due to their versatility. They have been employed for industrial castings, surface coatings, high strength adhesives, durable laminates, cold solders, lightweight foams, and potting compounds for all varieties of electrical and electronic apparatus.

One of the valuable properties of epoxide resins is their ability to be readily changed from the thermoplastic state to tough, hard thermoset solids. This hardening or curing is accomplished by the addition of a chemically active reagent which is called a curing agent. Polyfunctional primary and secondary amines are widely used as curing agents for epoxide resins. Each primary amine group is theoretically capable of reacting with two epoxide groups, one amine hydrogen for each epoxide. When a polyamine, such as ethylene diamine or diethylene triamine, is reacted with a polyepoxide resin, a complex crosslinked structure is produced, resulting in a thermoset resinous composition.

The reaction of a primary or secondary amine with an epoxide group results in the formation of a hydroxyl substituted amine.

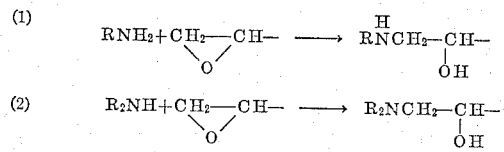

The reaction product of (1) is a hydroxyl substituted secondary amine which can react with another epoxide group to form a dihydroxy substituted tertiary amine.

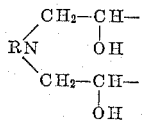

Monoprimary and mono- or disecondary amines, that is, amines which contain no more than two amino hydrogen atoms, are not normally considered to be curing agents for epoxide resins. When a monosecondary amine is reacted with a polyfunctional epoxide resin in the ratio of about one amine group to each epoxide group, a thermoplastic epoxide resin-amine addition product results. When a monoprimary or disecondary amine is reacted with a diepoxide resin in the ratio of about 2 to 1 mols of the amine to about 1 to 2 mols of diepoxide resin, thermoplastic polymeric epoxide resin-amine addition products result which are amine or epoxide terminated depending on the ratio of starting materials.

The monoprimary and secondary amine-epoxide resin addition products are thermoplastic compounds which contain a plurality of hydroxyl groups. This invention contemplates utilizing the hydroxyl groups to prepare thermoset resins. By the process of this invention, thermoplastic addition products of amines and polyepoxide resins are cured to the thermoset state with amine-aldehyde resins. The amine-aldehyde resins, which contain a plurality of methylol groups or methyl ether groups, react through the methylol groups with the hydroxyl groups of the amine-epoxide resin addition product to produce highly cross-linked thermoset products.

The curable compositions of this invention are thermoplastic addition products of a monoprimary amine, a disecondary amine, a monosecondary amine, or admixtures thereof, with a polyepoxide resin containing more than one 1,2 epoxy group per molecule, blended with an amine aldehyde resin in an amount of from about 10 to about 50 parts by weight of amine-aldehyde resin to about 50 to about 90 parts by weight of the thermoplastic addition product, the total weight being 100.

A process is proposed for preparing thermoset compositions by reacting a monoprimary amine, a disecondary amine, a monosecondary amine or mixtures thereof with a polyepoxide resin containing more than one 1,2 epoxy group per molecule to form a thermoplastic addition product, blending therein an amine-aldehyde resin in an amount of from about 10 to 50 parts by weight of amine-aldehyde resin to about 50 to about 90 parts by weight of the thermoplastic addition product, the total weight being 100, and heating the resulting composition at a temperature of about 100° C. to about 250° C. to form a thermoset composition.

A wide variety of epoxide compounds can be used to prepare amine-epoxide resin addition products useful in this invention. The useful epoxide resins are those having more than 1,2 epoxide group per molecule. They can be saturated or unsaturated, aliphatic, cycloaliphatic, aromatic, or heterocyclic. They can be monomeric or polymeric in nature.

The polyepoxide resins include epoxidized hydrocarbons, such as vinyl cyclohexene dioxide, butadiene dioxide, dicyclopentadiene dioxide, epoxidized polybutadiene and limonene dioxide. Other epoxide compounds are epoxidized esters, for example epoxidized unsaturated vegetable oils, epoxidized soybean oil, epoxidized glycerol trilinoleate and 3,4-epoxy-6-methylcyclohexylmethyl-3,4-epoxy-6-methylcyclohexanecarboxylate. Still other epoxides are polymers and copolymers of vinyl polymerizable monoepoxides, such monoepoxides being allyl glycidyl ether, glycidyl acrylate and glycidyl methacrylate.

Additional polyepoxides for use in the compositions of this invention include glycidyl ethers of polyhydric phenols obtained by reacting a polyhydric phenol in an excess of epichlorohydrin with sodium hydroxide. Such polyhydric phenols include bisphenol A (p,p'-dihydroxy-diphenyl propane), resorcinol, hydroquinone, 4,4'-dihydroxybenzophenone, bis(4-hydroxyphenyl) ethane, 1,5-dihydroxynaphthalene, 4,4'-dihydroxy biphenyl, novolak resins containing more than two phenol moieties linked through methylene bridges, and the like.

Other glycidyl polyethers are polymers prepared by reacting 1.2 up to about 2 mols of epichlorohydrin with 1 mol of a dihydric phenol or by reacting diepoxides with added dihydric phenol.

The compositions of this invention also include polyglycidyl ethers of polyhydric alcohols, made by reacting a polyhydric alcohol and epichlorohydrin with an acidic catalyst such as boron trifluoride, and subsequently treating the resulting product with an alkaline material. Included among the polyhydric alcohols that can be used in the preparation of these polyepoxides are glycerine, ethylene glycol, propylene glycol, diethylene glycol, hexanetriol, pentaerythritol, trimethylol ethane, trimethylol propane, etc. In addition, polyhydric ether alcohols, for instance diglycerol, dipentaerythritrol, polyalkylene glycols and hydroxyalkyl ethers of the aforementioned polyhydric phenols can be used.

Also included in the compositions of this invention are glycidyl esters of polycarboxylic acids, such acids being azelaic acid, terephthalic acid, dimerized and trimerized unsaturated fatty acids, etc.

Other polyepoxide resins useful in this invention are described in "Epoxy Resins" by Lee and Neville, McGraw-Hill Book Company, Inc., 1957.

The amines contemplated for use in preparing amine-epoxide resin addition products are monoprimary amines, monosecondary amines and disecondary amines, said amines containing at least one but not more than two amino hydrogens per molecule. They can be saturated or unsaturated, aliphatic, aromatic, cycloaliphatic, or heterocyclic, but contain no groups reactive with epoxide groups other than primary or secondary amine groups and hydroxyl groups.

Monoprimary amines that are useful in the compositions of this invention are primary amines that contain one nitrogen atom having one hydrocarbon substituent and two hydrogen atom substituents, the hydrocarbon substituent containing from one to about twenty carbon atoms. Such amines include methylamine, ethylamine, isopropylamine, butylamine, amylamine, hexylamine, aniline, cyclohexylamine, heptylamine, 2-ethyl-hexylamine, 2,4-diisopropylhexylamine and allylamine. Also included as useful monoprimary amines are the fatty primary amines, which are derived from fatty acids. Examples of these amines are caprylylamine, caprylamine, laurylamine, myristylamine, palmitylamine, stearylamine, oleylamine, linoleylamine and linolenylamine. Fatty amines also include mixtures of such amines, which are derived from corresponding mixed fatty acids and are named after the naturally occurring oils and waxes from which they are derived. Such amines are coconut amine, tallow amine, hydrogenated tallow amine, and soya amine.

Very useful monoprimary amines are hydroxyl containing primary amines, that is amines which contain at least one hydroxyl group. The particularly preferred hydroxy amines are primary amines which contain one nitrogen atom having one hydroxyl substituted hydrocarbon substituent and two hydrogen atom substituents, the hydrocarbon substituent containing one to about three hydroxyl groups and from two to about six carbon atoms. Examples of such amines are ethanol amine, isopropanol amine, 3-amino-propane-1,2-diol, 2-amino-propane-1,3-diol, 4-amino-butane-1,2-diol, 2-amino-2-methyl-propane-1,3-diol, tris(hydroxymethyl)-amino-methane and 2-amino-2-ethyl-propane-1,3-diol.

Secondary amines that can be used in this invention are disecondary amines and monosecondary amines. The disecondary amines are those amines which contain two nitrogen atoms linked together by a 2 to 10 carbon atom hydrocarbon radical and which contain one additional 1 to 10 carbon hydrocarbon substituent on each nitrogen atom and one hydrogen atom on each nitrogen. Examples of disecondary amines are N,N'-dimethyl ethylenediamine, N,N'-diethyl propylenediamine, N,N'-dibutyl-hexylenediamine, N-methyl-N'-butyl octylenediamine, piperazine, N,N'-dihydroxyethyl ethylenediamine, N-hydroxyethyl-N'-butyl butylenediamine, N,N'-dihydroxyisopropyl propylenediamine and the like.

The monosecondary amines contemplated for use in this invention are those amines which contain one nitrogen atom having one hydrogen atom substituent and two hydrocarbon substituents, each hydrocarbon substituent containing from 1 to about 20 carbon atoms. Examples of such monosecondary amines include dimethylamine, diethylamine, diisopropylamine, dibutylamine, di(2-ethylhexyl)amine, N-methyl butylamine, N-ethyl propylamine, N-methyl caprylamine, dilaurylamine, distearylamine, dioleylamine, and the like.

Particularly useful monosecondary amines are hydroxyl containing secondary amines wherein the hydrocarbon substituents on the nitrogen atom contain one or more hydroxyl groups. The preferred hydroxyl containing monosecondary amines are those amines which contain one to about three hydroxy groups and from 3 to about 8 carbon atoms. Such amines are diethanol amine, diisopropanol amine, dibutanol amine, N-methyl ethanol amine, N-ethyl ethanol amine, N-methyl butanol amine, tris(hydroxymethyl)-N-methyl-aminomethane, and so forth.

The amine-aldehyde resins to be employed in this invention are urea-aldehyde, alkyl substituted urea-aldehyde, thiourea-aldehyde and triazine-aldehyde resins and alcohol modified derivatives thereof, that is, alkylated amine-aldehyde resins wherein the alkyl radical contains from 1 to about 8 carbon atoms. The aldehyde used in preparing these amine-aldehyde resins are formaldehyde, which term includes the formaldehyde forming compounds trioxane and paraformaldehyde, as well as acetaldehyde, propionaldehyde and butryaldehyde, such aldehydes containing 1 to about 8 carbon atoms. The nitrogen compounds which are reacted with the aldehydes are urea, alkyl substituted ureas, thioureas, ethylene urea, dicyandiamide, melamine, benzoguanamine, acetoguanamine, etc., said compounds containing 2 to about 6 nitrogen atoms and 1 to about 12 carbon atoms.

The reaction products of aldehydes with the ureas or triazines can be used per se. However, the preferred amine-aldehyde resins are the resins which have been further reacted with an alcohol to form an alkyl ether of the methylol groups of the resin. The alcohols used herein contain from 1 to about 8 carbon atoms and include methyl alcohol, ethyl alcohol, isopropyl alcohol, butyl alcohol, hexyl alcohol and 2-ethylhexyl alcohol.

Amine-aldehyde resins are formed by the condensation of the nitrogenous compound with an aldehyde followed by etherification or alkylation with an alcohol. Resins of this type are readily available as commercial materials and can be prepared by methods disclosed in the art. Examples of such resins are described in "Polymer Processes" Vol. X, by Shildknecht, Interscience Publishers, Inc. (1956), "Polymers and Resins" by Golding, D. Van Nostrand Co., Inc. (1959) and "The Chemistry of Synthetic Resins," Vol. I, by Ellis, Reinhold Publishing Company, Inc. (1935).

In preparing the thermoplastic epoxide resin-amine addition product utilized in this invention, some considerations must be given to the functionalities of the particular amine and particular epoxide resin being reacted. In order to obtain a thermoplastic product a difunctional amine, that is, a monoprimary amine or a disecondary amine, should be reacted with an epoxide resin containing no more than 2 epoxide groups. Use of a more functional epoxide resin can result in a thermoset resin rather than a thermoplastic one. The difunctional amine and the diepoxide resin can be reacted in a molar ratio of 2:1 to 1:2. When the amine is used in excess, the addition product is amine terminated. When the epoxide resin is in excess, the addition product is epoxide terminated. As the molar ratio approaches 1 to 1, the molecular weight of the addition product increases. The preferred addition products are those wherein the primary amine and the diepoxide resin are reacted in a molar ratio of about 1 to 1.

The epoxide resin-amine addition products can be further modified by reacting a difunctional amine and a monofunctional amine with a diepoxide resin. The monofunctional amine serves as a chain terminator and helps in controlling the molecular weight. The monofunctional amine, the difunctional amine and the diepoxide resin are reacted in a molar ratio of 2 mols of monofunctional amine to X mols of difunctional amine to $X+1$ mols of diepoxide resin wherein X is a number from 1 to about 10.

The properties of the diepoxide-difunctional amine addition products will also vary with the type amine that is used. Addition products made with 1 to about 7 carbon atom amines and with hydroxyl amines are soluble in polar solvents such as ketones, esters, ethers, alcohols, polyols and ether alcohols but are sparingly soluble in aromatic hydrocarbons. These addition products are soluble, however, in aqueous acid solutions.

Addition products made with amines which contain from about 8 to about 20 carbon atoms are soluble in aromatic hydrocarbons as well as strong polar solvents. These products, however, have only limited solubility in aqueous acid solutions.

Monosecondary amines can be reacted with epoxide resins containing two or more epoxide groups to form thermoplastic addition products. The addition products are not polymers of the amine and the epoxide resin but are simple adducts. The preferred ratio of reactants is one mol of monosecondary amine per epoxide group of the resin. The preferred monosecondary amines are the hydroxyl containing amines since the addition products of these amines and epoxide resins have high hydroxyl functionality and are readily cured with amine-aldehyde resins.

Several reaction procedures can be used to prepare the amine-epoxide resin addition products. The amine and the epoxide resin can be simply mixed together and heated until the desired extent of reaction is obtained as determined by epoxide equivalent weight or viscosity. The reaction can also be conducted by slowly adding the epoxide resin to the amine. When reactive epoxide resins, such as glycidyl ethers of polyphenols, are used with reactive amines, such as low molecular weight primary amines, the second method is preferred, since the exothermic reaction is more controllable. These reactions can be carried out in the absence of solvents, but due to the exothermic nature of the reaction and the high viscosity of the reaction product, the use of solvents is generally preferred. The reaction of the amine and the polyepoxide resin is carried out at room temperature to about 200° C., the preferred temperature range being 70° C. to about 150° C.

In order to shorten the reaction time when using less reactive amines and/or epoxide resins, a strong organic base can be used as catalyst. Such organic bases are quaternary ammonium hydroxides and quaternary ammonium salts, for instance benzyl trimethyl ammonium chloride, tetramethyl ammonium bromide, etc. These organic bases are used in catalytic amounts, generally in the range of about 0.1 to about 3 weight percent based upon the weight of the reactants.

The curable compositions of this invention are prepared by simply blending the amine-epoxide addition product with the amine-aldehyde resin in an amount of from 10 to 50 parts by weight of the amine-aldehyde resin to 50 to 90 parts by weight of the amine-epoxide addition product, the total parts being 100. The blending operation can be conducted at room temperature, or can be carried out by heating the components. It is generally preferred, however, to dissolve the amine-epoxide resin addition product in a suitable solvent, as hereinbefore disclosed, before blending in the amine-aldehyde resin.

If desired, other ingredients can be added to the novel compositions before they are cured. Such ingredients include fillers, pigments, dyes, plasticizers and the like in the amounts ordinarily employed for such purposes. Combinations of the compositions of this invention with other resins, such as alkyd resins, phenolic resins, vinyl polymers and copolymers, polyisocyanates and polyepoxide resins, can be readily cured to form useful products.

The compositions of this invention are cured by heating at about 100° C. to about 250° C. for a period of about ten minutes to about two hours. The preferred temperature range is about 125° C. to about 200° C. and the time is about 10 minutes to 40 minutes. These compositions can be cured by heat alone, but generally it is preferred to add an acidic catalyst to the compositions before curing in order to obtain cured compositions at lower and shorter baking schedules. Acidic catalysts useful for this purpose are mineral acids and organic acids and their salts with amines. Such acids include p-toluene sulfonic acid, butyl acid phosphate, hydrochloric acid, phosphoric acid, sulfuric acid, maleic acid, phthalic acid, such acids having ionizaton constants greater than about $1 \times 10^{-5}$ at 25° C. in amounts of about 0.1 to about 2 percent by weight based upon the weight of amine-epoxide addition product and amine-aldehyde resins. Salts of such acids with amines are also included as useful catalysts in this invention.

The compositions of this invention can be used in pottings, castings, laminates and the like, but have found particular utility in protective and decorative coating applications as paints, enamels, varnishes and the like. When used as coatings, the compositions can be applied to the surface to be coated by any conventional means, such as by spraying, brushing, roller coating and dipping and by electrodeposition processes.

The following examples illustrate this invention. Parts and percents where used are intended to be parts and percents by weight. The epoxide resins used in these examples are defined as:

*Epoxide A.*—the diglycidyl ether of p,p'-dihydroxydiphenyl propane and prepared from 1 mol of p,p'-dihydroxydiphenyl propane and 10 mols of epichlorohydrin using about 2 mols of sodium hydroxide as dehydrohalogenating agent and having an epoxide equivalent weight of 185–195 and a viscosity of 12,000–16,000 cps. at 25° C.

*Epoxide B.*—molecularly distilled Epoxide A having an epoxide equivalent weight of 174–175 and a viscosity at 25° C. of 3600–5500 cps.

*Epoxide C.*—the reaction product of one mol of p,p'-dihydroxydiphenyl propane and 1.57 mols of epichlorohydrin reacted with about 1.75 mols of sodium hydroxide, and having an epoxide equivalent weight of 475–525 and a melting point of 70° C.

*Epoxide D.*—epoxidized linseed oil having an epoxide equivalent weight of 178 and a viscosity of 880 cps. at 25° C.

*Epoxide E.*—epoxidized soya oil having an epoxide equivalent weight of 228 and a viscosity at 25° C. of 300 cps.

*Epoxide F.*—epoxidized polymer of butadiene having an epoxide equivalent weight of 177 and a viscosity at 25° C. of 180,000 cps.

*Example 1*

To a suitable reaction flask equipped with a stirrer, condenser, dropping funnel and thermometer were added 32.2 parts of n-butyl amine and 100 parts of dipropylene glycol methyl ether. To the dropping funnel were added a solution of 167.8 parts of Epoxide A and 100 parts of dipropylene glycol methyl ether. Heat was applied to the flask raising the temperature of the flask contents to 79° C. The Epoxide A solution was then added to the flask over a period of 50 minutes while holding the temperature at 78° C.–79° C. After the addition was completed, the temperature was raised to 149° C. and was held at 149° C. to 154° C. for 40 minutes. 100 parts of dipropylene glycol methyl ether were added to the epoxide-amine reactants and heating at 146° C. to 150° C. was continued for 6 hours and 45 minutes. The resulting product solution had a Gardner-Holdt viscosity of Y to Z and an epoxide equivalent weight of 5138 on solids basis. 21.3 parts of this butylamine-epoxide resin adduct solution were blended with 2.5 parts of a solution of methylated methylol melamine at 60 weight percent solids in water, 0.8 part of a 25 weight percent solution of the morpholine salt of p-toluene sulfonic acid in water and 9.5 parts of dipropylene glycol methyl ether. 3 mil films were drawn down on glass panels and were baked at 150° C. for 30 minutes. The resulting films were well cured and exhibited good mar resistance, good adhesion and good flexibility.

Example 2

To a suitable flask equipped as described in Example 1 were added 39.2 parts of aniline and 100 parts of dipropylene glycol methyl ether. To the dropping funnel were added a solution of 160.8 parts of Epoxide A and 100 parts of dipropylene glycol methyl ether. The flask contents were heated to 93° C. and dropwise addition of the epoxide resin solution was begun. The epoxide resin solution was added over a 3-hour period while the temperature of the reactants was slowly raised to 151° C. Heating was continued at 147° C. to 158° C. for 11 hours. The reactants were cooled and additional dipropylene glycol methyl ether (100 parts) was added. The resulting adduct solution had a Gardner-Holdt viscosity of Y and an epoxide equivalent weight of 8683 on solids basis.

To 18.8 parts of the aniline-epoxide resin adduct solution were blended 4.2 parts of a 60 weight percent solution methylated methylol melamine in water, 0.8 part of a 25 weight percent solution of the morpholine salt of p-toluene sulfonic acid in water and 10.3 parts of dipropylene glycol methyl ether. Films were prepared on electrolytic tin plate using a 2 mil doctor blade and were baked at 150° C. for 30 minutes. The resulting well-cured films were extremely hard and exhibited excellent mar resistance.

Example 3

Using the same procedure as described in Example 1, 149 parts of Epoxide A were reacted with 51 parts of 2-ethylhexylamine in 200 parts of dipropylene glycol methyl ether. The resulting amine-epoxide adduct solution had a Gardner-Holdt viscosity of $Z_5$ and an epoxide equivalent weight of 9000 on solids basis.

Three blends were prepared from the amine-epoxide adduct solution as follows: Blend 1 was made from 18 parts of adduct solution, 1 part of hexamethoxymethyl melamine, 6 parts of propylene glycol methyl ether and 0.3 part of a 25 weight percent solution of the morpholine salt of p-toluene sulfonic acid in water; Blend 2 contained 16 parts of the adduct solution, 2 parts of hexamethoxymethyl melamine, 7 parts of propylene glycol methyl ether and 0.3 part of the morpholine salt solution; Blend 3 contained 17 parts of the adduct solution, 1.5 parts of hexamethoxymethyl melamine, 6.5 parts of propylene glycol methyl ether and 0.3 part of the morpholine salt solution.

Films were prepared from the three blends by drawing them down on glass panels with a 3 mil doctor blade. After a 30 minute bake at 180° C., all the films were well cured, and exhibited excellent mar resistance, adhesion and hardness.

Example 4

To a suitable reaction flask equipped with a stirrer, condenser and thermometer were added 127 parts of Epoxide B, 73 parts of distilled coconut fatty amine and 135 parts of toluene. The reactants were heated at 116° C. for 14 hours and 23 minutes. The solution was reduced to 40 percent solids with 165 parts of toluene. The resulting solution had a Gardner-Holdt viscosity of $Z_3$ to $Z_4$, a Gardner color of 2 and no epoxide content.

To 15 parts of the amine-epoxide adduct solution were added 6.7 parts of a butylated urea-formaldehyde resin at 60 percent solids in butanol and xylene, 3.3 parts of toluene and 0.32 part of the morpholine salt of p-toluene sulfonic acid at 25 weight percent concentration in ethanol. Films were drawn down on electrolytic tin plate with a 2 mil doctor blade and were baked at 150° C. for 30 minutes. The resulting films were well cured, having a pencil hardness of HB–F, very good mar resistance, good resistance to boiling water and excellent flexibility.

An additional blend was prepared from 21.3 parts of the amine-epoxide adduct solution, 1.5 parts of hexamethoxymethyl melamine, 0.12 part of the morpholine salt of p-toluene sulfonic acid at 25 percent concentration in ethanol and 2.2 parts of toluene. 2 mil films were drawn down on electrolytic tin plate and were baked 20 minutes at 180° C. The films were well cured and exhibited a pencil hardness of B–HB, very good mar resistance, excellent resistance to boiling water and excellent flexibility.

Example 5

To a suitable reaction flask equipped as described in Example 4 were added 130.6 parts of Epoxide A, 69.4 parts of coconut primary amine and 135 parts of toluene. The reactants were heated at 114° C. to 116° C. for 18 hours. 165 parts of toluene were added reducing the solids content to 40 weight percent. The resulting solution had a Gardner-Holdt viscosity of W, a Gardner color of 4, and an epoxide equivalent weight of 7,232 on solids basis.

To 15 parts of the amine-epoxide adduct solution were added 6.7 parts of a butylated urea-formaldehyde resin at 60 percent solids in butanol and xylene, 0.32 part of the morpholine salt of p-toluene sulfonic acid at 25 percent concentration in ethanol and 3.3 parts of toluene. 2 mil films were drawn down on electrolytic tin plate and were baked 30 minutes at 150° C. The resulting well-cured films had a pencil hardness of HB–F, and exhibited very good mar resistance, excellent resistance to boiling water and excellent flexibility.

Example 6

Using the same procedure as was described in Example 4, 203.7 parts of Epoxide B were reacted with 37.8 parts of 2-ethylhexylamine and 58.5 parts of distilled coconut amine in 200 parts of toluene at 115° C. for 14 hours. After reduction to 40 weight percent solids with 250 parts of toluene, the solution had a Gardner-Holdt viscosity of $Z_2$ to $Z_3$, a Gardner color of 1 and an epoxide equivalent weight of 16,100 on solids basis.

20 parts of the amine-epoxide adduct solution were blended with 3.3 parts of a butylated urea-formaldehyde resin at 60 percent solids in butanol and xylene, 1.7 parts of toluene and 0.8 part of the morpholine salt of p-toluene sulfonic acid at 25 percent concentration in ethanol. 3 mil films were prepared from the blends on glass panels and were baked at 180° C. for 30 minutes. The resulting well-cured films had good mar resistance and excellent adhesion.

Example 7

Using the same procedure as was described in Example 4, 118.4 parts of Epoxide A were reacted with 81.6 parts of distilled tallow amine in 135 parts of toluene for 21 hours at 115° C. After reduction to 40 percent solids with 165 parts of toluene, the solution had a Gardner-Holdt viscosity of $Z$–$Z_1$, a Gardner color of 4 and an epoxide equivalent weight of 21,381 on solids basis.

20 parts of the amine-epoxide adduct were blended with 4 parts of an isobutylated melamine-formaldehyde resin at 50 weight percent solids in isobutanol, 1 part of toluene and 0.12 part of the morpholine salt of p-toluene sulfonic acid at 25 percent concentration in ethanol. 3 mil films were prepared from the blend on glass panels and were baked at 180° C. for 30 minutes. The resulting well-cured films had good mar resistance, good adhesion and excellent flexibility.

Example 8

To a suitable reaction flask equipped as described in Example 4 were added 19.4 parts of monoisopropanolamine, 34 parts of tallow amine, 146.6 parts of Epoxide A and 135 parts of toluene. The reactants were heated to 115° C. and were held at 115° C. for 4 hours. 50 parts of toluene were added and heating at 115° C. was continued for 14 hours. 115 parts of propylene glycol methyl ether were added. The resulting solution had a Gardner-Holdt viscosity of $Z_2$ to $Z_3$, a Gardner color of 2 to 3 and an epoxide equivalent weight of 52,663 on solids basis.

21.3 parts of the amine-epoxide adduct solution were blended with 1.5 parts of hexamethoxymethyl melamine, 0.56 part of the morpholine salt of p-toluene sulfonic acid at 25 percent concentration in ethanol and 2.2 parts of propylene glycol methyl ether. 3 mil films were prepared on electrolytic tin plate and were baked at 180° C. for 20 minutes. The resulting well-cured films had excellent adhesion, good mar resistance, good flexibility and a pencil hardness of F–H.

*Example 9*

Using the same procedure as was described in Example 4, 158.6 parts of Epoxide C were reacted with 41.4 parts of tallow amine in 135 parts of toluene for 19 hours at 115° C. After reduction to 37.4 percent solids with 150 parts of toluene and 50 parts of propylene glycol methyl ether, the solution had a Gardner-Holdt viscosity of V, a Gardner color of 3, and no epoxide content.

20 parts of the amine-epoxide adduct solution were blended with 4.2 parts of a butylated urea-formaldehyde resin at 60 percent solids in xylene and butanol, 0.32 part of the morpholine salt of p-toluene sulfonic acid at 25 percent concentration in ethanol and 0.8 part of propylene glycol methyl ether. 3 mil films were prepared on glass panels and were cured by heating for 30 minutes at 180° C. The resulting well-cured films had excellent mar resistance, good adhesion, good flexibility and a pencil hardness of 2H–3H.

*Example 10*

Using the same procedure as was described in Example 4, 118 parts of Epoxide A were reacted with 82 parts of distilled hydrogenated tallow primary amine in 135 parts of toluene by heating at 115° C. for 18 hours. After reduction to 40 weight percent solids with 165 parts of toluene, the resulting amine-epoxide adduct solution had a Gardner-Holdt viscosity of $Z_2$, a Gardner color of 2 and no epoxide content.

21.3 parts of the amine-epoxide adduct solution were blended with 1.5 parts of hexamethoxymethyl melamine, 0.32 part of the morpholine salt of p-toluene sulfonic acid at 25 percent concentration in ethanol and 2.2 parts of toluene. 3 mil films were prepared from the blend by drawing them down on glass panels. The films were heated at 180° C. for 20 minutes. The resulting well-cured films had a pencil hardness of 2B–B and exhibited excellent adhesion, good mar resistance, good flexibility and excellent resistance to boiling water.

*Example 11*

Using the same procedure as was described in Example 4, 116.6 parts of Epoxide A were reacted with 83.4 parts of distilled stearyl primary amine in 135 parts of toluene for 18 hours at 115° C. After reduction to 40 weight percent solids with 165 parts of toluene, the amine-epoxide adduct solution had a Gardner-Holdt viscosity of $Z_1$ to $Z_2$, a Gardner color of 2 and no epoxide content.

A blend was prepared from 15 parts of the amine-epoxide adduct solution, 6.7 parts of a butylated urea-formaldehyde resin at 60 percent solids in butanol and xylene, 0.32 part of the morpholine salt of p-toluene sulfonic acid at 25 percent concentration in ethanol and 3.3 parts of toluene. 3 mil films were drawn down on glass panels and were baked for 30 minutes at 150° C. the resulting films were well cured, exhibited good mar resistance, excellent resistance to boiling water, good flexibility and a pencil hardness of B–HB.

*Example 12*

To a suitable reaction flask equipped with a thermometer, stirrer, condenser and dropping funnel were added 172 parts of Epoxide A and 100 parts of dipropylene glycol methyl ether. To the dropping funnel were added 27.8 parts of monoethanol amine dissolved in 100 parts of dipropylene glycol methyl ether. Heat was applied to the flask raising the temperature of the flask contents to 78° C. The monoethanol amine solution was then added over a period of 54 minutes while holding the temperature between 78 and 81° C. The temperature of the reactants was raised to 140° C. and was held at this temperature for one hour. 100 parts of dipropylene glycol methyl ether were added and heating at 140° C. was continued for an additional 11 hours. The amine-epoxide adduct solution was reduced to 30 percent solid by adding 167 parts of dipropylene glycol methyl ether. The solution had a Gardner-Holdt viscosity of $Z_2$ to $Z_3$ and no epoxide content.

A blend was prepared from 28.3 parts of the amine-epoxide adduct solution, 1.5 parts of hexamethoxymethyl melamine and 3.5 parts of dipropylene glycol methyl ether. 2 mil films were drawn down on electrolytic tin plate and were baked at 218° C. for 20 minutes. The resulting well-cured films had good mar resistance, good flexibility and excellent adhesion.

*Example 13*

To a suitable reaction flask equipped with a stirrer, condenser and thermometer were added 172.2 parts of Epoxide A, 27.8 parts of monoethanolamine and 200 parts of dipropylene glycol methyl ether. Heat was applied to the flask raising the temperature to 80° C. The heat source was removed and the temperature rose to 107° C. due to the exothermic reaction. Heat was reapplied and the reactants were heated at 140° C. to 145° C. for 12 hours. The Gardner-Holdt viscosity of the amine-epoxide adduct solution after being reduced to 30 percent solids with 167 parts of dipropylene glycol methyl ether was $Z_1$ to $Z_2$. The solution contained no unreacted epoxide groups.

A blend was prepared from 28.3 parts of the amine-epoxide adduct solution, 2.5 parts of a benzoguanamine-formaldehyde resin at 60 percent solids in propylene glycol methyl ether, 0.3 part of the morpholine salt of p-toluene sulfonic acid at 25 percent concentration in water and 2.5 parts of propylene glycol methyl ether. 3 mil films were drawn down on glass and were heated at 180° C. for 30 minutes. The resulting well-cured films exhibited excellent adhesion, toughness and mar resistance.

*Example 14*

Using the same procedure as was described in Example 13, 166.8 parts of Epoxide A were reacted with 33.2 parts of monoisopropanolamine in 300 parts of propylene glycol methyl ether by heating at 120° C. for 13 hours. The resulting amine-epoxide adduct solution had a Gardner-Holdt viscosity of $Z_3$ to $Z_4$ and an epoxide equivalent weight of 16,800.

3 mil films were prepared on glass panels from a blend of the amine-epoxide adduct solution with 15 weight percent on solids basis of hexamethoxymethyl melamine and 1 weight percent of the morpholine salt of p-toluene sulfonic acid. After a 30-minute bake at 180° C., the films were well cured and exhibited excellent mar resistance and toughness.

*Example 15*

Using the same procedure as was described in Example 13, 250 parts of Epoxide A were reacted with 50 parts of monoisopropanol amine in 30 parts of dipropylene glycol methyl ether by heating at 160° C. for 18 hours. After reduction to 30 percent solids with 400 parts of propylene glycol methyl ether, the resulting amine-epoxide adduct solution had a Gardner-Holdt viscosity of Z and no epoxide content.

A blend was prepared from 28.3 parts of the amine-epoxide adduct solution, 2.5 parts of a butylated urea-formaldehyde resin at 60 percent solids in butanol and xylene, 2.5 parts of propylene glycol methyl ether and 0.3 part of the morpholine salt of p-toluene sulfonic acid at 25 percent concentration in water. 3 mil films were drawn down on glass panels and were baked at 180° C. for 30 minutes. The resulting well-cured films had excellent adhesion to the glass panels and good flexibility.

*Example 16*

To a suitable reaction flask equipped with a stirrer, condenser, thermometer and dropping funnel were added 213.6 parts of diethanolamine. To the dropping funnel were added 386.4 parts of Epoxide A dissolved in 96.6 parts of propylene glycol methyl ether. Heat was applied to the flask raising the temperature of the flask contents to 100° C. The epoxide solution was then added at 100° C. over a one-hour period. 20 parts of propylene glycol methyl ether were added and heating at 100° C. was continued for 2 hours. The flask was fitted with a distillation condenser and water aspirator vacuum (25–30 mm. Hg pressure) was applied. The flask contents were heated to 122° C. over a one-hour period to remove the solvent. A clear yellow semi-solid product containing no unreacted epoxide groups resulted.

The amine-epoxide adduct was dissolved in a 10 percent acetic acid solution in water at 60 percent concentration and was further reduced to 50 percent concentration with water. This solution was blended with hexamethoxymethyl melamine in a weight ratio based on solids of 80/20 and with 1 percent based on total solids of the morpholine salt of p-toluene sulfonic acid. 3 mil films were drawn down on glass panels and were baked at 180° C. for 30 minutes. The resulting well-cured films exhibited excellent hardness, adhesion, mar resistance and toughness.

*Example 17*

Using the same procedure as was described in Example 16, 61.2 parts of diethanolamine and 16.8 parts of monoethanolamine were reacted with 221.1 parts of Epoxide A using 65.3 parts of propylene glycol methyl ether as solvent. The resulting product after removal of the solvent was a clear yellow solid with an epoxide equivalent weight of 34,600. The solid product was soluble to 60 percent solids in a 10 percent acetic acid solution in water. This acid solution was further reduced to 40 percent solids with water containing no acid.

A blend was prepared from 20 parts of the 40 percent aqueous solution of the amine-epoxide adduct, 2 parts of hexamethoxymethyl melamine, 3 parts of water and 0.6 part of the morpholine salt of p-toluene sulfonic acid at 25 percent concentration in water. 3 mil films were drawn down on glass and were baked at 180° C. for 30 minutes. The resulting films were well-cured and exhibited excellent mar resistance and adhesion to the glass.

*Example 18*

To a suitable reaction flask equipped as described in Example 13 were added 754.8 parts of Epoxide D, 445.2 parts of diethanol amine and 40 parts of a 60 weight percent solution of benzyl trimethyl ammonium chloride in water. The reactants were heated at 150° C. for four hours. The resulting product was a clear viscous liquid having no epoxide content.

The amine-epoxide adduct was dissolved at 50 percent concentration in a 10 percent acetic acid solution in water. This solution was blended with hexamethoxymethyl melamine in a weight ratio based on solids of 85/15 and with 1 percent based on total solids of the morpholine salt of p-toluene sulfonic acid. 3 mil films were drawn down on glass panels and were baked at 180° C. for 30 minutes. The resulting well-cured films had very good flexibility, mar resistance and adhesion properties.

*Example 19*

Using the same procedure as was described in Example 18, 205.8 parts of Epoxide E were reacted with 94.2 parts of diethanol amine and 10 parts of a 60 percent aqueous solution of benzyl trimethyl ammonium chloride for 10 hours at 150° C. The resulting product was a clear viscous liquid that contained no unreacted epoxide groups.

13 parts of the amine-epoxide adduct were blended with 11.7 parts of a butylated urea-formaldehyde resin at 60 percent solids in butanol and xylene, 2 parts of propylene glycol methyl ether and 1 part of the morpholine salt of butyl acid phosphate at 50 percent concentration in ethylene glycol butyl ether. 2 mil films were drawn down on glass panels and were baked at 180° C. for 30 minutes. The resulting films were well cured and exhibited very good mar resistance and adhesion to the glass panels.

*Example 20*

Using the same procedure as was described in Example 18, 111.6 parts of diethanolamine were reacted with 188.4 parts of Epoxide F and 10 parts of a 60 percent aqueous solution of benzyl trimethyl ammonium chloride for 10 hours at 150° C. The resulting product was a tacky solid containing no epoxide content.

17 parts of a solution of the amine-epoxide adduct dissolved to 50 percent solids in a 10 percent acetic acid solution in water were blended with 1.5 parts of hexamethoxymethyl melamine and 0.6 part of the morpholine salt of p-toluene sulfonic acid at 25 percent concentration in water. 3 mil films were drawn down on glass and were baked at 180° C. for 30 minutes. The resulting well-cured films had very good adhesion to the glass and were mar resistant and tough.

It is to be understood that the foregoing detailed description is given merely by way of illustration and that many variations may be made therein without departing from the spirit of my invention.

The embodiments of the invention in which an exclusive property or privilege is claimed are defined as follows:

1. Curable compositions consisting essentially of
   (A) a thermoplastic addition product of
      (a) an amine selected from at least one member of the group consisting of monoprimary amines, disecondary amines and monosecondary amines and
      (b) a polyepoxide resin containing more than one 1,2 epoxy group per molecule;
   (B) an amine-aldehyde resin in an amount of from about 10 to about 50 parts by weight of amine-aldehyde resin to about 50 to about 90 parts by weight of the thermoplastic addition product, the total weight being 100; and
   (C) an acid catalyst selected from at least one member of the group consisting of mineral acids, organic acids and amine salts of the acids, said acids having ionization constants greater than about $1 \times 10^{-5}$ at 25° C. in an amount of about 0.1 to about 2 percent by weight based on the total weight of (A) and (B).

2. Curable compositions consisting essentially of
   (A) a thermoplastic addition product of
      (a) a monoprimary amine and
      (b) a diepoxide resin containing about two 1,2 epoxy groups per molecule
         wherein the amine and the diepoxide resin are reacted in a mol ratio of 1:2 to 2:1;
   (B) an amine-aldehyde resin in an amount of from about 10 to about 50 parts by weight of amine-aldehyde resin to about 50 to about 90 parts by weight of the thermoplastic addition product, the total weight being 100; and
   (C) an acid catalyst selected from at least one member of the group consisting of mineral acids, organic acids and amine salts of the acids, said acids having ionization constants greater than about $1\times10^{-5}$ at 25° C. in an amount of about 0.1 to about 2 percent by weight based on the total weight of (A) and (B).

3. Curable compositions consisting essentially of
(A) a thermoplastic addition product of
 (a) a disecondary amine and
 (b) a diepoxide resin containing about two 1,2 epoxy groups per molecule
  wherein the amine and the diepoxide resin are reacted in a mol ratio of 1:2 to 2:1;
(B) an amine-aldheyde resin in an amount of from about 10 to about 50 parts by weight of amine-aldehyde resin to about 50 to about 90 parts by weight of the thermoplastic addition product, the total weight being 100; and
(C) an acid catalyst selected from at least one member of the group consisting of mineral acids, organic acids and amine salts of the acids, said acids having ionization constants greater than about $1\times10^{-5}$ at 25° C. in an amount of about 0.1 to about 2 percent by weight based on the total weight of (A) and (B).

4. Curable compositions consisting essentially of
(A) a thermoplastic addition product of
 (a) a monosecondary amine and
 (b) a polyepoxide resin containing more than one 1,2 epoxy group per molecule
  wherein the amine and the polyepoxide resin are reacted in the ratio of about 1 mol of amine per each epoxy group of the polyepoxide resin;
(B) an amine-aldehyde resin in an amount of from about 10 to about 50 parts by weight of amine-aldehyde resin to about 50 to about 90 parts by weight of the thermoplastic addition product, the total weight being 100; and
(C) an acid catalyst selected from at least one member of the group consisting of mineral acids, organic acids and amine salts of the acids, said acids having ionization constants greater than about $1\times10^{-5}$ at 25° C. in an amount of about 0.1 to about 2 percent by weight based on the total weight of (A) and (B).

5. Curable compositions consisting essentially of
(A) a thermoplastic addition product of
 (a) a monoprimary amine
 (b) a monosecondary amine, and
 (c) a diepoxide resin containing about two 1,2 epoxy groups per molecule,
  wherein (a), (b), and (c) are reacted in the ratio of $X$ mols of (a) to 2 mols of (b) to $X+1$ mols of (c) with X being an integer from 1 to about 10;
(B) an amine-aldehyde resin in an amount of from about 10 to about 50 parts by weight of amine-aldehyde resin to about 50 to about 90 parts by weight of the thermoplastic addition product, the total weight being 100; and
(C) an acid catalyst selected from at least one member of the group consisting of mineral acids, organic acids and amine salts of the acids, said acids having ionization constants greater than about $1\times10^{-5}$ at 25° C. in an amount of about 0.1 to about 2 percent by weight based on the total weight of (A) and (B).

6. A process for preparing thermoset compositions which consists essentially of
(A) reacting
 (a) an amine selected from at least one member of the group consisting of monoprimary amines, disecondary amines and monosecondary amines with
 (b) a polyepoxide resin containing more than one 1,2 epoxy group per molecule to form a thermoplastic addition product,
(B) blending therein an amine-aldehyde resin in an amount of from about 10 to 50 parts by weight of amine-aldehyde resin to about 50 to about 90 parts by weight of the thermoplastic addition product, the total weight being 100, and an acid catalyst selected from at least one member of the group consisting of mineral acids, organic acids and amine salts of the acids, said acids having ionization constants greater than about $1\times10^{-5}$ at 25° C. in an amount of about 0.1 to about 2 percent by weight based on the total weight of the amine aldehyde resin and the thermoplastic addition product, and
(C) heating the resulting composition at a temperature of about 100° C. to about 250° C. to form a thermoset composition.

7. A process for preparing thermoset compositions which consists essentially of
(A) reacting
 (a) a monoprimary amine with
 (b) a diepoxide resin containing about two 1,2 epoxy groups per molecule
  wherein the amine and the diepoxide resin are reacted in a mol ratio of 1:2 to 2:1 to form a thermoplastic addition product,
(B) blending therein an amine-aldehyde resin in an amount of from about 10 to 50 parts by weight of amine-aldehyde resin to about 50 to about 90 parts by weight of the thermoplastic addition product, the total weight being 100, and an acid catalyst selected from at least one member of the group consisting of mineral acids, organic acids and amine salts of the acids, said acids having ionization constants greater than about $1\times10^{-5}$ at 25° C. in an amount of about 0.1 to about 2 percent by weight based on the total weight of the amine aldehyde resin and the thermoplastic addition product, and
(C) heating the resulting composition at a temperature of about 100° C. to about 250° C. to form a thermoset composition.

8. A process for preparing thermoset compositions which consists essentially of
(A) reacting
 (a) a disecondary amine with
 (b) a diepoxide resin containing about two 1,2 epoxy groups per molecule
  wherein the amine and the diepoxide resin are reacted in a mol ratio of 1:2 to 2:1 to form a thermoplastic addition product,
(B) blending therein an amine-aldehyde resin in an amount of from about 10 to 50 parts by weight of amine-aldehyde resin to about 50 to about 90 parts by weight of the thermoplastic addition product, the total weight being 100, and an acid catalyst selected from at least one member of the group consisting of mineral acids, organic acids and amine salts of the acids, said acids having ionization constants greater than about $1\times10^{-5}$ at 25° C. in an amount of about 0.1 to about 2 percent by weight based on the total weight of the amine aldehyde resin and the thermoplastic addition product, and
(C) heating the resulting composition at a temperature of about 100° C. to about 250° C. to form a thermoset composition.

9. A process for preparing thermoset compositions which consists essentially of
(A) reacting
 (a) a monosecondary amine with
 (b) a polyepoxide resin containing more than one 1,2 epoxy group per molecule
  wherein the amine and the polyepoxide resin are reacted in a ratio of about 1 mol of amine per each epoxy group of the polyepoxide resin to form a thermoplastic addition product,
(B) blending therein an amine-aldehyde resin in an amount of from about 10 to 50 parts by weight of amine-aldehyde resin to about 50 to about 90 parts by weight of the thermoplastic addition product, the total weight being 100, and an acid catalyst selected from at least one member of the group consisting of mineral acids, organic acids and amine salts of the acids, said acids having ionization constants greater than about $1 \times 10^{-5}$ at 25° C. in an amount of about 0.1 to about 2 percent by weight based on the total weight of the amine aldehyde resin and the thermoplastic addition product, and (C) heating the resulting composition at a temperature of about 100° C. to about 250° C. to form a thermoset composition.

10. A process for preparing thermoset compositions which consists essentially of (A) reacting
 (a) monoprimary amine
 (b) a monosecondary amine, and
 (c) a diepoxide resin containing about two 1,2 epoxy groups per molecule
  wherein (a), (b), and (c) are reacted in the ratio of X mols of (a) to 2 mols of (b) to $X+1$ mols of (c) and wherein X is an integer from 1 to about 10 to form a thermoplastic addition product, (B) blending therein an amine-aldehyde resin in an amount of from about 10 to 50 parts by weight of amine-aldehyde resin to about 50 to about 90 parts by weight of the thermoplastic addition product, the total weight being 100, and an acid catalyst selected from at least one member of the group consisting of mineral acids, organic acids and amine salts of the acids, said acids having ionization constants greater than about $1 \times 10^{-5}$ at 25° C. in an amount of about 0.1 to about 2 percent by weight based on the total weight of the amine aldehyde resin and the thermoplastic addition product, and (C) heating the resulting composition at a temperature of about 100° C. to about 250° C. to form a thermoset composition.

11. The composition of claim 2 wherein the monoprimary amine is a primary fatty amine and the diepoxide resin is a diglycidyl polyether of a dihydric phenol having an epoxide equivalent weight of about 150 to about 500 and wherein the amine and the diepoxide resin are reacted in the mol ratio of about 1:1.

12. The composition of claim 2 wherein the monoprimary amine is a hydroxyl containing primary amine and the diepoxide resin is a diglycidyl polyether of a dihydric phenol having an epoxide equivalent weight of about 150 to about 500 and wherein the amine and the diepoxide resin are reacted in the mol ratio of about 1:1.

13. The composition of claim 4 wherein the monosecondary amine is a hydroxyl containing secondary amine and the polyepoxide resin is an epoxidized unsaturated vegetable oil having an epoxide equivalent weight of about 160 to about 250.

14. The composition of claim 4 wherein the monosecondary amine is a hydroxyl containing secondary amine and the polyepoxide resin is an epoxidized butadiene polymer.

15. The composition of claim 5 wherein the monoprimary amine is a hydroxyl containing primary amine, the monosecondary amine is a hydroxyl containing secondary amine, the diepoxide resin is a diglycidyl polyether of a dihydric phenol having an epoxide equivalent weight of 150 to 500 and X is an integer from 1 to 4.

16. The cured composition resulting from the process of claim 6.

References Cited

UNITED STATES PATENTS

| | | | |
|---|---|---|---|
| 2,643,239 | 6/1953 | Shokal | 260—830 |
| 2,910,459 | 10/1959 | Rothrock | 260—834 |
| 2,921,050 | 1/1960 | Belanger | 260—2 |

FOREIGN PATENTS

| | | |
|---|---|---|
| 885,215 | 12/1961 | Great Britain. |
| 8,852,216 | 12/1961 | Great Britain. |

MURRAY TILLMAN, *Primary Examiner.*

P. LIEBERMAN, *Assistant Examiner.*